Feb. 11, 1930.  J. JOHNSON  1,746,480
AUTOMOBILE TURNING SIGNAL
Filed Dec. 24, 1928
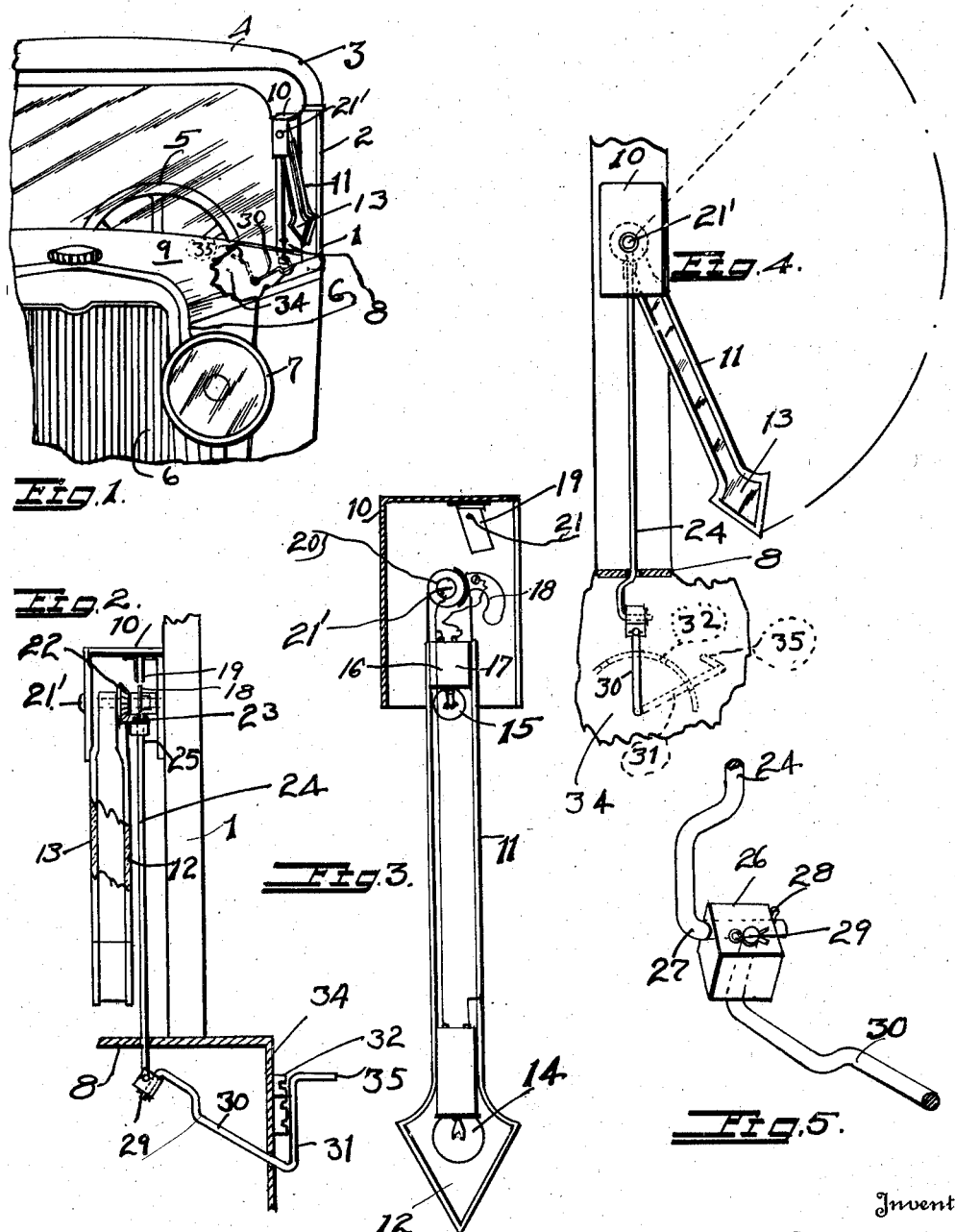

Patented Feb. 11, 1930

1,746,480

UNITED STATES PATENT OFFICE

JOHN JOHNSON, OF RICHMOND, CALIFORNIA

AUTOMOBILE TURNING SIGNAL

Application filed December 24, 1928. Serial No. 328,116.

This invention relates to an automobile turning signal, and its object is to provide means whereby persons in closed cars may readily indicate to other automobiles, both in front of them and in the rear of them, what kind of a turn they are about to make.

It will be understood by those skilled in driving automobiles that at the present time the commonly accepted signal is for a person to stick out the hand hanging downwardly for a stop, horizontally for a left turn and inclined upwardly for a right turn.

With the present invention an arm which is illuminated on both front and back throughout its length is used to effect the same result, the arm hanging downwardly and being illuminated throughout its length when a stop is to be made, extending horizontally when a left hand turn is to be made and inclined upwardly when a right hand turn is to be made.

In the present invention the casing carrying the arm is secured to the front post at the left hand side of a closed car, a rod for the operation of the arm extending vertically downward from the casing through the hood of the automobile, and having a universal joint at its lower end which enables the driver of the car by turning a small crank to set the arm at any one of the three desired positions used for signal purposes, and as said arm is set it automatically engages the points of a switch which supplies electric current to two small lamps contained within the signal arm thereby brightly illuminating a strip of glass throughout the length of the arm and enabling persons both at the front and at the rear of the car to see which way the driver is about to turn.

Other objects of the invention will be apparent as the description proceeds.

An embodiment of the invention is shown in the accompanying drawings in which the same reference numeral is applied to the same portion throughout the several figures of the drawings, and of which there may be modifications.

Figure 1 is a front elevation partly in perspective of a portion of an automobile, showing the application of this signal thereto, Figure 2 is a side elevation of a portion of the corner post of the automobile showing a portion of the hood and dash board inside the car for the complete operation of the signal arm, Figure 3 is a front elevation of the signal arm with the front of its supporting casing removed for purposes of illustration, Figure 4 is a front elevation of the signal arm showing the signal in the stop position, and Figure 5 is a perspective view of the universal joint used for turning the signal arm.

The numeral 1 indicates the front corner post of the body of an enclosed car; 2 representing the door; 3 the top; 4 the glass wind shield; 5 the steering wheel; 6 the outline of the radiator; 7 the headlight; 8 the fixed part of the hood, and 9 the hinged part of the hood over the engine.

The signal is all secured to a rectangular casing 10 about the width of the front posts of the corner of an automobile enclosure. This casing is open on the bottom and sides to permit the arm 11 to hang down or to be turned to a raised position about 45 degrees above the horizontal position as indicated in the dotted line on Figure 4.

The arm 11 consists of a hollow sheet metal arm with two strips of glass 12 and 13 secured inside the arm in such a way as to permit the glass to show throughout the length of the arm as indicated at 13 in Figures 1 and 4. Inside this hollow arm are the lamps 14 and 15 which are supplied with current from the two wires 16 and 17, one of said wires being grounded, and the other being connected to an insulated curved knife contact 18 which will contact with the fixed plate 19 as soon as the arm comes up to the stop position indicated in Figure 4. Wires 20, 21 extend to a suitable source of electric current supply, and supply the lamps with current to illuminate them whenever the signal is in use.

The arm swings on a pivot 21' which is mounted in the rectangular sheet metal casing 10 and which carries a bevel gear 22 which is in mesh with a bevel gear 23 on the upper end of a vertically extending rod 24.

The rod 24 is journalled in a bracket 25 within the casing so that it holds the two gears 22 and 23 in mesh with each other, and it extends through the fixed portion of the hood 8 into the driver's compartment. On the lower end of the rod 24 there is a small square block 26, the lower end of the rod 24 being bent to extend horizontally as indicated at 27 to pass through a hole in the block 26. A cotter pin 28 holds the rod 27 and block together.

At the side of the member 27 the block has a hole extending at right angles to the hole for the rod 27, to receive a member 29 on the end of the crank rod 30, said crank rod 30 having an operating handle 31 which is capable of engaging any one of three notches of a curved plate 32, which plate is fastened to any convenient portion of the instrument board 34 within convenient reach of the driver.

In use the driver will apply his hand to the crank 35 inside the driving compartment and will turn the shaft 30 to raise the arm 11 to any one of the three desired signalling positions, that is "stop" "left turn" and "right turn", and the signal arm may be left in any one of those positions by placing the crank arm 31 in any one of the three notches on the curved plate 32.

Having thus described my invention what I desire to to secure by Letters Patent of the United States is as follows, but modifications may be made in carrying out the invention as shown in the drawings and in the above particularly described form thereof, within the purview of the annexed claim.

I claim:

An automobile turning and stopping signal comprising a casing open at the bottom and one side, a signal arm pivoted in said casing, adapted to extend below the bottom of said casing and to swing up in the open side thereof, a bevel gear on said arm, a pinion in mesh with said gear, a rod having its upper end fixed in said pinion and the lower end extending into the hood of an automobile, said lower end being bent at right angles to said rod, a block pivoted onto said bent portion, another rod having its end bent at right angles thereto, and pivoted in said block at right angles to said first rod, a crank formed on the outer end of the second rod, outside of said hood, whereby the signal arm may be turned to various positions to indicate turning or stopping signals.

In testimony whereof I have hereunto set my hand this 17 day of December, A. D. 1928.

JOHN JOHNSON.